(12) United States Patent
Gonioukh et al.

(10) Patent No.: US 6,444,607 B1
(45) Date of Patent: Sep. 3, 2002

(54) CATALYST SOLUTION FOR THE POLYMERIZATION OF α-OLEFINS

(75) Inventors: Andrei Gonioukh, Dudenhofen; Eckard Schauss, Heuchelheim; Roger Klimesch, Alsbach-Hähnlein; Andreas Deckers, Flomborn; Wilhelm Weber, Neustadt, all of (DE)

(73) Assignee: Basell Polyolefine GmbH, Ludwigshafen (DE)

( * ) Notice: Subject to any disclaimer, the term of this patent is extended or adjusted under 35 U.S.C. 154(b) by 0 days.

(21) Appl. No.: 09/423,113

(22) PCT Filed: Apr. 24, 1998

(86) PCT No.: PCT/EP98/02452

§ 371 (c)(1),
(2), (4) Date: Nov. 2, 1999

(87) PCT Pub. No.: WO98/51715

PCT Pub. Date: Nov. 19, 1998

(30) Foreign Application Priority Data

May 9, 1997 (DE) .......................... 197 19 517

(51) Int. Cl.[7] .......................... B01J 31/38; C08F 4/44; C08F 2/06
(52) U.S. Cl. ...................... 502/155; 502/104; 502/152; 526/75; 526/89; 526/160; 526/161; 526/348.6; 526/943
(58) Field of Search ................... 526/153, 133, 526/134, 142, 160, 161, 943, 352, 348.6, 75, 89; 502/153, 125, 132, 154, 156, 104, 152, 155

(56) References Cited

U.S. PATENT DOCUMENTS 5,908,903 A * 6/1999 Rosch .......................... 526/153
6,174,972 B1 * 2/2001 Daire .......................... 526/144

FOREIGN PATENT DOCUMENTS

| EP | 572034 | 12/1993 |
| EP | 612769 | 8/1994 |
| EP | 648786 | 4/1995 |
| EP | 709393 | 5/1996 |
| WO | 91/09882 | 7/1991 |
| WO | 93/2590 | 12/1993 |

OTHER PUBLICATIONS

Wiesenfeldt et al., *J. of Org. Chem.*, 369, 1989, 359–370.
*Ullmann's Enc. der tech. Chemie*, vol. 19, 1980, 169–195.

* cited by examiner

*Primary Examiner*—David W. Wu
*Assistant Examiner*—R. Harlan
(74) *Attorney, Agent, or Firm*—Keil & Weinkauf

(57) ABSTRACT

A catalyst solution for polymerizing α-olefins is obtainable by reacting a metallocene compound with an activator compound which can react with the metallocene compound so as to displace a ligand from the central atom and stabilize the resulting cationic complex by a non-coordinating anion as an ion pair, adding one or more α-olefins in a molar ratio of metallocene compound: α-olefins of from 1:1 und 1:100 and mixing with at least 10 parts by volume of an aliphatic hydrocarbon.

9 Claims, No Drawings

CATALYST SOLUTION FOR THE POLYMERIZATION OF α-OLEFINS

The present invention relates to a catalyst solution for polymerizing α-olefins, obtainable by a) reacting a metallocene compound of the formula I

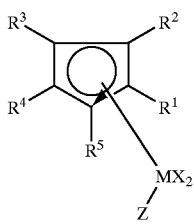

where the substituents have the following meanings:

M is titanium, zirconium, hafnium, vanadium, niobium or tantalum

X is hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —OR$^6$ or —NR$^6$R$^7$, where R$^6$ and R$^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, R$^1$ to R$^5$ are hydrogen, $C_1$–$C_{10}$-alkyl, 5- to 7-membered cycloalkyl which may in turn bear a $C_1$–$C_{10}$-alkyl as substituent, $C_6$–$C_{15}$-aryl or arylalkyl, where two adjacent radicals may also together form a saturated or unsaturated cyclic group having from 4 to 15 carbon atoms, or Si(R$^8$)$_3$ where R$^8$ is $C_1$–$C_{10}$-alkyl, $C_3$–$C_{10}$-cycloalkyl or $C_6$–$C_{15}$-aryl, Z is X or

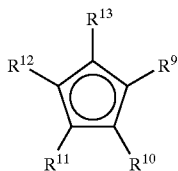

where the radicals

R$^9$ to R$^{13}$ are hydrogen, $C_1$–$C_{10}$-alkyl, 5- to 7-membered cycloalkyl which may in turn bear a $C_1$–$C_{10}$-alkyl as substituent, $C_6$–$C_{15}$-aryl or arylalkyl, where two adjacent radicals may also together form a saturated or unsaturated cyclic group having from 4 to 15 carbon atoms, or Si(R$^{14}$)$_3$ where R$^{14}$ is $C_1$–$C_{10}$-alkyl, $C_6$–$C_{15}$-aryl or $C_3$–$C_{10}$-cycloalkyl, or where the radicals R$^4$ and Z together form an —R$^{15}$—A— group in which R$^{15}$ is

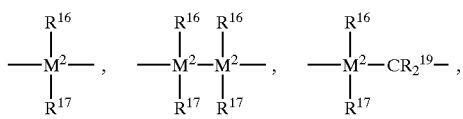

-continued

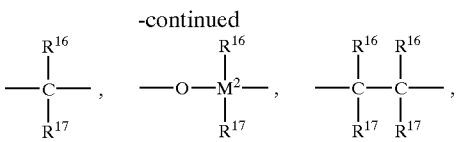

=BR$^{16}$, =AlR$^{16}$, —Ge—, —Sn—, —O—, —S—, =SO, =SO$_2$, =NR$^{16}$, =CO, =PR$^{16}$ or =P(O)R$^{16}$, where R$^{16}$, R$^{17}$ and R$^{18}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a ring, and M$^2$ is silicon, germanium or tin, A is

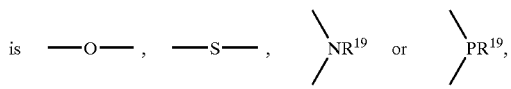

where

R$^{19}$ is $C_1$–$C_{10}$-alkyl, $C_6$–$C_{15}$-aryl, $C_3$–$C_{10}$-cycloalkyl, alkylaryl or Si(R$^{20}$)$_3$, R$^{20}$ is hydrogen, $C_1$–$C_{10}$-alkyl, $C_6$–$C_{15}$-aryl which may in turn bear $C_1$–$C_4$-alkyl groups as sub-stituents or $C_3$–$C_{10}$-cycloalkyl or the radicals R$^4$ and R$^{12}$ together form an —R$^{15}$— group, with an activator compound which can react with the metallocene compound I so as to displace a ligand X from the central atom M and to stabilize the resulting cationic complex by means of a non-coordinating anion as ion pair, b) adding one or more α-olefins in a molar ratio of metallocene compound I: α-olefin of from 1:1 to 1:100 and c) mixing with at least 10 parts by volume of an aliphatic hydrocarbon.

The present invention further relates to a process for polymerizing α-olefins in the presence of this catalyst solution and also to the use of this catalyst solution for the polymerization of α-olefins.

The cationic activation of metallocene complexes to form active catalyst compounds has been described in numerous publications. In these reactions, the metallocene complex is reacted with an ion-exchange component, eg. a cation or a Lewis acid which is able to irreversibly react with one of the complexing ligands, and a non-coordinating anion which can stabilize the resulting cationic metallocene complexes. The structure of many metallocene complexes, but in particular the structure of the activating reagents and of the ion pairs of cationic metallocene complex and anionic non-coordinating counterion formed during the course of the activation, makes moderately polar solvents generally necessary for this reaction, for example aromatic or halogenated hydrocarbons. Thus, EP-A-709 393 describes the cationic activation of metallocene complexes having substituted fluorophenyl ligands in toluene as solvent. WO-93/25590 likewise describes the cationic activation of metallocene complexes, with preference being given to using aromatic solvents, in particular toluene (see examples) for these reactions. The linear, branched or alicyclic hydrocarbons which are likewise mentioned for this purpose have generally been found to be unsuitable for this purpose since they have only insufficient solvent capability for, in particular, the cationic metallocene complexes and the activation reagents.

The cationically activated metallocene complexes can also be advantageously used in unsupported form in slurry or solution polymerization processes. Solvents which have been found to be suitable for these polymerization processes, in particular for polymerization processes at high temperature and high pressure, are, in particular, aliphatic solvents, in particular saturated hydrocarbons. In contrast, aromatic and halogenated hydrocarbons have disadvantages which are presumably attributable to their reactivity and to a destruction or blocking of the catalyst by these compounds. In polymerizations in these solvents, a lower catalyst productivity, a greater need for alkyl compounds for eliminating impurities and an increased proportion of wax-like by-products in the polymers are observed. However, the unsatisfactory solubility of cationically activated metallocene catalysts in aliphatic solvents has hitherto usually made the use of aromatic solvents necessary in such solution polymerization processes.

It is an object of the present invention to increase the solubility of cationically activated catalyst complexes so that they have sufficient solubility in aliphatic solvents.

We have found that this object is achieved by the catalyst solution described in the introduction for polymerizing α-olefins, a process for polymerizing α-olefins in the presence of this catalyst solution and the use of this catalyst solution for the polymerization of α-olefins.

Among the metallocene complexes of the formula I, preference is given to

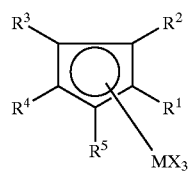

Ia

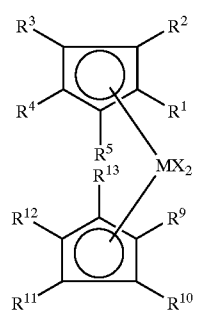

Ib

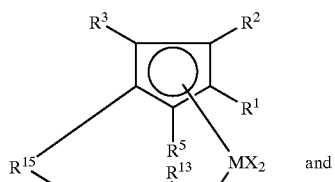

Ic

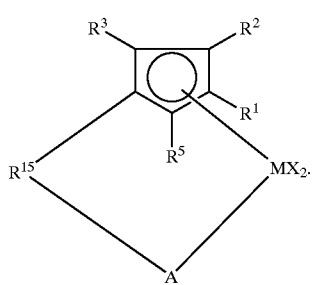

Id

Particular preference is given to those transition metal complexes which have two aromatic ring systems bridged to one another as ligands, ie. in particular the transition metal complexes of the formula Ic.

The radicals X can be identical or different; they are preferably identical.

Among the compounds of the formula Ia, particular preference is given to those in which M is titanium, zirconium or hafnium, X is $C_1$–$C_4$-alkyl or phenyl and $R^1$ to $R^5$ is hydrogen or $C_1$–$C_4$-alkyl.

Among the compounds of the formula Ib, preference is given to those in which

M is titanium, zirconium or hafnium,

X is $C_1$–$C_4$-alkyl or phenyl, $R^1$ to $R^5$ is hydrogen, $C_1$–$C_4$-alkyl or $Si(R^8)_3$, $R^9$ to $R^{13}$ is hydrogen, $C_1$–$C_4$-alkyl or $Si(R^{14})_3$.

In particular, suitable compounds of the formula Ib are those in which the cyclopentadienyl radicals are identical.

Examples of particularly suitable compounds are, inter alia, those which are derived from the following compounds II:

bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and also the corresponding dimethylzirconium compounds.

Particularly suitable compounds of the formula Ic are those in which $R^1$ and $R^9$ are identical and are hydrogen or $C_1$–$C_{10}$-alkyl groups, $R^5$ and $R^{13}$ are identical and are hydrogen, methyl, ethyl, isopropyl or tert-butyl, $R^2$, $R^3$, $R^{10}$ and $R^{11}$ have the meanings: $R^3$ and $R^{11}$ are $C_1$–$C_4$-alkyl, $R^2$ and $R^{10}$ are hydrogen, or two adjacent radicals $R^2$ and $R^3$ or $R^{10}$ and $R^{11}$ together form a cyclic group having from 4 to 12 carbon atoms, $R^{15}$ is

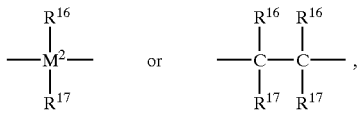

M is titanium, zirconium or hafnium and

X is $C_1$–$C_4$-alkyl or phenyl.

Examples of particularly suitable complexes are, inter alia, those which are derived from the following compounds II:

dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-methylindenyl)zirconium dichloride,
dimethylsilanediylbis(2-methylbenzindenyl)zirconium dichloride
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl) zirconium dichloride,
diphenylsilanediylbis(2-methylbenzindenyl)zirconium dichloride,
diphenylsilanediylbis(2-ethylbenzindenyl)zirconium dichloride, and
dimethylsilanediylbis(2-methylindenyl)hafnium dichloride and also the corresponding dimethylzirconium compounds.

Particularly suitable compounds of the formula Id are those in which

M is titanium or zirconium,

X is $C_1$–$C_4$-alkyl or phenyl, $R^{15}$ is

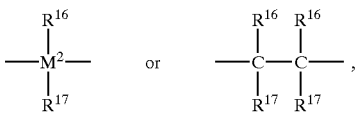

A is —O—, —S—,

and $R^1$ to $R^3$ and $R^5$ are hydrogen, $C_1$–$C_{10}$-alkyl, $C_3$–$C_{10}$-cycloalkyl, $C_6$–$C_{15}$-aryl or $Si(R^8)_3$, or two adjacent radicals form a cyclic group having from 4 to 12 carbon atoms.

The synthesis of such complexes can be carried out using methods known per se, with preference being given to reacting the appropriately substituted, cyclic hydrocarbon anions with halides of titanium, zirconium, hafnium, vanadium, niobium or tantalum.

Examples of appropriate preparative methods are described, inter alia, in Journal of Organometallic Chemistry, 369 (1989), 359–370.

It is also possible to use mixtures of various metallocene complexes.

Suitable activator compounds are strong, uncharged Lewis acids, ionic compounds having Lewis acid cations and ionic compounds having Brönsted acids as cation.

As strong, uncharged Lewis acids, preference is given to compounds of the formula III $$M^3X^1X^2X^3 \qquad \text{III}$$

where $M^3$ is an element of main group III of the Periodic Table, in particular B, Al or Ga, preferably B, $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the formula III in which $X^1$, $X^2$ and $X^3$ are identical, preferably tris(pentafluorophenyl)borane.

Suitable ionic compounds having Lewis acid cations are compounds of the formula IV

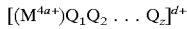

where $M^4$ is an element of main groups I to VI or transition groups I to VIII of the Periodic Table, $Q_1$ to $Q_z$ are singly negatively charged radicals such as $C_1$–$C_{28}$-alkyl, $C_6$–$C_{15}$-aryl, alkylaryl, arylalkyl, haloalkyl, haloaryl each having from 6 to 20 carbon atoms in the aryl radical and from 1 to 28 carbon atoms in the alkyl radical, $C_1$–$C_{10}$-cycloalkyl which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6, z is an integer from 0 to 5 and d is the difference a–z, but d is greater than or equal to 1.

Particularly suitable Lewis acid cations are carbonium cations, oxonium cations and sulfonium cations and also cationic transition metal complexes. Particular mention may be made of the triphenylmethyl cation, the silver cation and the 1,1'-dimethylferrocenyl cation. They preferably have non-coordinating counter-ions, in particular boron compounds as are also mentioned in WO 91/09882, preferably tetrakis(pentafluorophenyl)borate.

Ionic compounds having Brönsted acids as cations and likewise non-coordinating counter ions are mentioned in WO 91/09882; the preferred cation is the N,N-dimethylanilinium cation.

The solubility of the cationically activated metallocene compound in aliphatic solvents is drastically increased by the reaction step b), ie. by reaction with a small amount of one or more α-olefins. A wide variety of α-olefins can be used, preferably those having from 2 to 20 carbon atoms. These α-olefins can be linear or branched. Particular preference is given to adding butene, hexene or octene. Mixtures of any of the α-olefins mentioned can also be used.

The α-olefins are used either in an equimolar ratio or in an excess of up to 100-fold based on the metallocene compound I. Even a small excess of α-olefins significantly increases the solubility of the complex in aliphatic solvents. Particularly in the case of relatively long-chain α-olefins, for instance those having from 6 to 12 carbon atoms, addition of an equimolar amount is often sufficient, but in the case of shorter α-olefins an excess is advisable. The molar ratio of metallocene compound I: α-Olefin in step b) is preferably from 1:1 to 1:10.

In reaction step a), ie. the activation of the metallocene complex I, a moderately polar solvent is usually necessary in order to keep all reaction components sufficiently dissolved in a very small volume. The preparative step a) is preferably carried out in the presence of an aromatic or halogenated hydrocarbon, particularly preferably in the presence of toluene or xylene.

The reaction with the α-olefin is generally carried out at from –90 to 150° C., preferably from 30 to 110° C., with the reaction time being at least 0.1 sec.

After the activation of the metallocene complex I and the reaction with the α-olefin, the reaction mixture is mixed with at least 10 parts by volume of an aliphatic hydrocarbon. This mixing can be carried out directly in combination with the subsequent polymerization reaction, ie. for example by introducing the reaction mixture from step b) into a polymerization vessel and diluting it appropriately there. This dilution can be carried out before addition of the olefin to be polymerized, but an olefin/solvent mixture can also be charged initially so that the polymerization can commence simultaneously with the dilution of the reaction mixture from step b). However, it is also possible and for practical reasons often advantageous to carry out the dilution of the reaction mixture from step b) using at first only the appropriate amount of the aliphatic solvent. This gives a storage-stable, active catalyst solution which can be used at a later point in time in a customary manner for polymerization reactions.

In order to make full use of the advantages of the catalyst solution of the present invention, the reaction mixture from step b) has to be mixed with at least 10 parts by volume of an aliphatic hydrocarbon before use in the later polymerization process. An even greater dilution volume can be advantageous for process reasons. In any case, good results are achieved by dilution with from 10 to 1000, preferably from 10 to 100, parts by volume. In this context, the term hydrocarbon also includes mixtures of various hydrocarbons.

The metallocene compound I can be prepared in various ways with which those skilled in the art are familiar. An advantageous synthesis starts from metallocene compounds of the formula II. It is particularly advantageous if the reaction to produce the metallocene compound I is carried out in situ by reacting a metallocene compound of the formula II

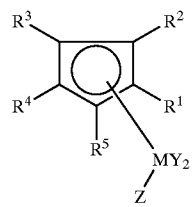

II where $R^1$, $R^2$, $R^3$, $R^4$, $R^5$, M and Z are as defined above and

Y is fluorine, chlorine, bromine or iodine, with an appropriate alkyl of a metal of main group I, II or III of the Periodic Table and the resulting solution is reacted further in step a) without purification.

As alkyl of a metal of main group I, II or III of the Periodic Table, it is possible here to use any alkyl compound customarily used for the alkylation of metallocene complexes. Preference is given to using aluminum alkyls such as triisobutylaluminum for this purpose.

The catalyst solution of the present invention can be used in all customary polymerization processes for the polymerization or co-polymerization of α-olefins, if desired with other vinylic monomers. It can also be used to prepare supported catalysts. However, the advantages of the catalyst solution of the present invention are particularly apparent in processes for polymerizing α-olefins in the presence of this catalyst solution, in which the polymerization is carried out in solution with an essentially aliphatic solvent.

Both pure hydrocarbons and hydrocarbon mixtures are useful as solvents here. Examples which may be mentioned are hexane, heptane, octane, nonane, decane, dodecane and isododecane, where both linear and branched isomers as well as their mixtures can be used.

The catalyst solution of the present invention can be used particularly advantageously in solution polymerizations, eg. in autoclave processes and in high-pressure processes, with the latter preferably being carried out in tube reactors.

Preference is given to processes for polymerizing α-olefins, in which the polymerization is carried out at from 160 to 350° C. and at pressures of from 500 to 3500 bar. Particularly preferred temperatures for these processes are from 180 to 240° C., particularly preferred pressures are from 1400 to 2000 bar. Further details for carrying out such polymerizations in high-pressure reactors are described, for example, in "Ullmann's Encyklopädie der technischen Chemie", Verlag Chemie, Weinheim, Volume 19, (1980), pages 169 to 195.

The polymerization process of the present invention enables various α-olefins to be polymerized. In this context, polymerization includes both homopolymerization and copolymerization of different α-olefins or of α-olefins with other vinylic comonomers such as styrene. The catalyst solution is particularly useful in processes for polymerizing α-olefins in which ethylene or a mixture of ethylene and subordinate amounts of further $C_1$–$C_8$-α-olefins is used as α-olefin. These $C_1$–$C_8$-α-olefins are generally present in the corresponding copolymers in amounts of 0.5–10% by weight.

The use of the catalyst solution of the present invention for the polymerization of α-olefins has various advantages: the solubility and miscibility with aliphatic solvents makes the presence of relatively large amounts of aromatic or halogenated solvents unnecessary. The catalyst complex is therefore more stable and has a longer shelf life. Fewer termination reactions are observed and thus smaller proportions of wax-like polymers are obtained in the polymerization products. The polymers obtained therefore have particularly good homogeneity. In addition, the catalyst solutions of the present invention display better productivities than corresponding catalyst solutions based on toluene.

The following examples illustrate the advantages of the invention:

EXAMPLES

Preparation of the catalyst solutions of the present invention:

Example 1

200 mmol of triisobutylaluminum (TIBA) (2M solution in heptane) were added to a solution of bis(n-BuCp)ZrCl$_2$ (20 mmol) in 2 l of toluene and the mixture was stirred for 1 hour at 20° C.

24 mmol of N,N-dimethylanilinium tetrakis(pentafluorophenyl)borate were then added and the mixture was stirred for 15 minutes. To this solution there was added 40 mmol of 1-octene and the resulting solution was stirred for another 15 minutes. The resulting solution was diluted with 2 l of isododecane, the precipitate formed was separated off by decantation and the supernatant liquid was diluted with 48 l of isododecane.

Example 2

Using a method similar to Example 1, a catalyst solution was prepared from diphenylmethylene(cyclopentadienyl) (2,7-di-tert-butyl-fluorenyl)zirconium dichloride.

Example 3

Using a method similar to Example 1, a catalyst solution was prepared from (tert-butylamido)dimethyl(tetramethyl-η$^5$-cyclopentadienyl)silanetitanium dichloride.

Preparation of comparative catalyst solutions not according to the present invention:

C-1

Using a method similar to Example 1, 20 mmol of bis(n-BuCp)ZrCl$_2$ were cationically activated. After reaction with the borate solution, the resulting solution was diluted with 48 l of toluene.

C-2

The metallocene complex of Example 2 (diphenylmethylene(cyclopentadienyl) (2,7-di-tert-butylfluorenyl)zirconium dichloride)was reacted using a method similar to C-1.

C-3

The metallocene complex of Example 3 ((tert-butylamido)dimethyl (tetramethyl -η$^5$-cyclopentadienyl) silanetitanium dichloride) was reacted using a method similar to C-1.

Polymerization Experiments

Example 4 (Solution Polymerization)

Ethylene was injected under a pressure of 20 kg/cm$^2$ into a 2 l autoclave charged with 1.2 l of isododecane. The solution was thermostated at 50° C. 5 ml of the catalyst solution from Example 1 were injected into the autoclave with argon, the resulting solution was stirred for 20 minutes. The resulting polymer was dried for 6 hours at 100° C. under reduced pressure.

C-4 (Comparative Experiment not According to the Present Invention)

Using a method similar to Example 4, a polymerization was carried out using the catalyst solution from C-1.

Examples 5–7 (Polymerization in a High-pressure Reactor)

Polymerizations were carried out at 210° C. and 1700 bar in a high-pressure tube reactor having an l/d ratio of 1333. The catalyst solution was metered in at the beginning of the reactor in a concentration of 7.59×10$^{-2}$ μmol of catalyst complex/mol of olefin.

In Example 5, only ethylene was fed in, while in Examples 6 and 7 1-hexene was metered in as comonomer in a molar comonomer ratio ethylene/hexene of 56.

C5-7 (comparative Experiments not According to the Present Invention)

Using a method similar to Examples 5–7, high-pressure polymerizations were carried out using the catalyst solutions of C1–C3.

TABLE

Results of the polymerization experiments

| Ex. | Catalyst Solution | Catalyst productivity kg of polymer/g of metallocene | MFI (190/ 2.16 g/ 10 min) | $M_w/M_n$ | Density g/cm$^3$ | Proportion of wax* % by wt. |
|---|---|---|---|---|---|---|
| E-4 | E-1 | 109.8 | 2.9 | 2.0 | 0.9442 | 1.33 |
| E-5 | E-1 | 153.0 | 15 | 2.2 | 0.9584 | 1.81 |
| E-6 | E-2 | 105 | 7.6 | 1.9 | 0.9383 | 1.28 |
| E-7 | E-3 | 108 | 0.8 | 2.0 | 0.9278 | 1.20 |
| C-4 | C-1 | 102.8 | 3.4 | 2.1 | 0.9430 | 10.40 |
| C-5 | C-1 | 73.5 | 43 | 2.6 | 0.9563 | 12.63 |
| C-6 | C-2 | 89.1 | 5.7 | 2.2 | 0.9377 | 10.88 |
| C-7 | C-3 | 91.4 | 1.4 | 2.0 | 0.9312 | 9.53 |

*The proportion of wax was determined by gel permeation chromatography in 1,2,4-trichlorobenzene at 140° C.

We claim:

1. A catalyst solution for polymerizing α-olefins, obtained by a) reacting a metallocene compound of the formula I

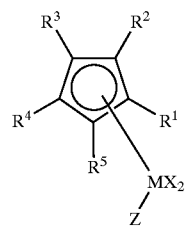

I wherein the substituents have the following meanings:

M is titanium, zirconium, hafnium, vanadium, niobium or tantalum

X is hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —OR$^6$ or —NR$^6$R$^7$, wherein R$^6$ and R$^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^1$ to $R^5$ are hydrogen, $C_1$–$C_{10}$-alkyl, 5- to 7-membered cycloalkyl which may in turn bear a $C_1$–$C_{10}$-alkyl as substituent, $C_6$–$C_{15}$-aryl or arylalkyl, where two adjacent radicals may also together form a saturated or unsaturated cyclic group having from 4 to 15 carbon atoms, or $Si(R^8)_3$ where $R^8$ is $C_1$–$C_{10}$-alkyl, $C_3$–$C_{10}$-cycloalkyl or $C_6$–$C_{15}$-aryl, Z is X or

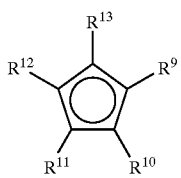

wherein the radicals $R^9$ to $R^{13}$ are hydrogen, $C_1$–$C_{10}$-alkyl, 5- to 7-membered cycloalkyl which may in turn bear a $C_1$–$C_{10}$-alkyl as substituent, $C_6$–$C_{15}$-aryl or arylalkyl, where two adjacent radicals may also together form a saturated or unsaturated cyclic group having from 4 to 15 carbon atoms, or $Si(R^{14})_3$ where $R^{14}$ is $C_1$–$C_{10}$-alkyl, $C_6$–$C_{15}$-aryl or $C_3$–$C_{10}$-cycloalkyl, or wherein the radicals $R^4$ and Z together form an —$R^{15}$—A— group in which $R^{15}$ is

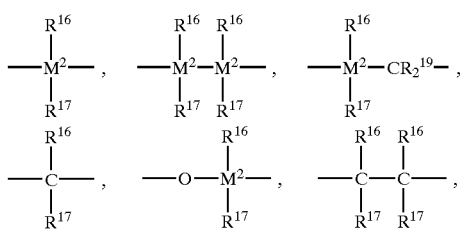

—$BR^{16}$—, —$AlR^{16}$—, —Ge—, —Sn—, —O—, —S—, —SO—, —$SO_2$—, —$NR^{16}$—, —CO—, —$PR^{16}$— or —$P(O)R^{16}$—, wherein $R^{16}$, $R^{17}$ and $R^{18}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a ring, and $M^2$ is silicon, germanium or tin, A is

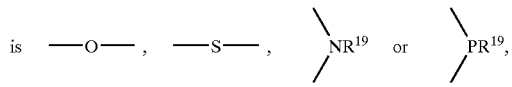

wherein $R^{19}$ is $C_1$–$C_{10}$-alkyl, $C_6$–$C_{15}$-aryl, $C_3$–$C_{10}$-cycloalkyl, alkylaryl or $Si(R^{20})_3$, $R^{20}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl or the radicals $R^4$ and $R^{12}$ together form an —$R^{15}$— group, with an activator compound which can react with the metallocene compound I so as to displace a ligand X from the central atom M and to stabilize the resulting cationic complex by means of a non-coordinating anion as ion pair, b) adding one or more α-olefins in a molar ratio of metallocene compound I: α-olefin of from 1:1 to 1:100 and c) mixing with at least 10 parts by volume of an aliphatic hydrocarbon.

2. A catalyst solution as claimed in claim 1, wherein preparative step a) is carried out in the presence of an aromatic or halogenated hydrocarbon as solvent.

3. A catalyst solution as claimed in claim 1, wherein the metallocene compound I is produced in situ by reacting a metallocene compound of the formula II

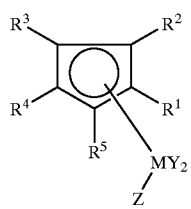

II where $R^1$, $R^2$, $R^3$, $R^4$, $R^5$, M and Z are as defined above and

Y is fluorine, chlorine, bromine or iodine, with an appropriate alkyl of a metal of main group I, II or III of the Periodic Table and the resulting solution is reacted further in step a) without purification.

4. A catalyst solution as claimed in claim 3, wherein said alkyl of a metal is an aluminum alkyl.

5. A catalyst solution as claimed in claim 1, wherein the molar ratio of metallocene compound I: α-olefin in step b) is from 1:1 to 1:10.

6. A catalyst solution as claimed in claim 1, wherein the α-olefin added in step b) is butene, hexene or octene.

7. A process for polymerizing α-olefins in the presence of a catalyst solution as claimed in claim 1, wherein the polymerization is carried out in solution using an essentially aliphatic solvent.

8. A process for polymerizing α-olefins as claimed in claim 7, wherein the polymerization is carried out at from 160 to 350° C. and at pressures of from 500 to 3500 bar.

9. A process for polymerizing α-olefins as claimed in claim 7, wherein the α-olefin used is ethylene or a mixture of ethylene and subordinate amounts of further $C_1$–$C_8$-α-olefins.

* * * * *